United States Patent [19]

Ames et al.

[11] 4,185,144
[45] Jan. 22, 1980

[54] ELECTROCHEMICAL CELL WITH A CADMIUM PATCH ELECTRODE

[75] Inventors: Allan E. Ames, Reading; Stanley M. Bloom, Waban; Arnold Hoffman, Brookline; Kenneth Norland, Belmont, all of Mass.

[73] Assignee: Polaroid Corporation, Cambridge, Mass.

[21] Appl. No.: 939,876

[22] Filed: Sep. 5, 1978

[51] Int. Cl.$^2$ .............................................. H01M 6/42
[52] U.S. Cl. .................................. 429/156; 429/199; 429/222
[58] Field of Search ............... 429/199, 222, 156, 162

[56] References Cited

U.S. PATENT DOCUMENTS

| | | | |
|---|---|---|---|
| 2,662,928 | 12/1953 | Brennan | 136/24 |
| 3,326,721 | 6/1967 | Henderson et al. | 136/24 |
| 3,494,796 | 2/1970 | Grulke et al. | 136/83 |
| 3,543,662 | 12/1970 | Erlich | 95/11 |
| 3,543,663 | 12/1970 | Lyon | 95/13 |
| 3,595,661 | 7/1971 | Gold | 96/76 |
| 3,607,406 | 9/1971 | Marincio | 429/199 |
| 3,705,542 | 12/1972 | Gold | 95/19 |
| 3,731,608 | 5/1973 | Shenk | 95/42 |
| 3,750,543 | 8/1973 | Eloranta et al. | 95/10 CE |
| 3,770,504 | 11/1973 | Bergum | 136/10 |
| 3,770,505 | 11/1973 | Bergum et al. | 136/10 |
| 3,774,516 | 11/1973 | Burgarella et al. | 95/42 |
| 3,775,273 | 11/1973 | Haines et al. | 204/115 |
| 3,783,025 | 1/1974 | King et al. | 136/76 |
| 3,791,278 | 2/1974 | Biber et al. | 95/53 E |
| 3,805,204 | 4/1974 | Petersen | 335/255 |
| 3,811,081 | 5/1974 | Abbadessa | 318/375 |
| 3,820,128 | 6/1974 | Bergarella et al. | 354/32 |
| 3,837,919 | 9/1974 | Gutrdige | 136/24 |
| 3,953,242 | 4/1976 | Hoffman | 136/155 |
| 4,007,472 | 2/1977 | Land | 429/153 |
| 4,048,404 | 9/1977 | Bro | 429/199 |

*Primary Examiner*—Charles F. LeFevour
*Attorney, Agent, or Firm*—John W. Ericson

[57] ABSTRACT

A cadmium patch laminar electrode, comprising a dispersion of particulate cadmium in a binder matrix on a conductive plastic substrate is prepared by contacting a zinc patch electrode comprising a dispersion of particulate zinc in a binder matrix on a conductive plastic substrate with an aqueous solution of a cadmium salt. The cadmium patch electrode can be used in a primary electrochemical cell such as that employing a manganese dioxide cathode and a cadmium chloride electrolyte.

4 Claims, No Drawings

ELECTROCHEMICAL CELL WITH A CADMIUM PATCH ELECTRODE

BACKGROUND OF THE INVENTION

This invention relates to electrical energy power supplies and more particularly, to laminar cells and batteries.

U.S. Pat. Nos. 3,705,542, 3,543,662, 3,543,663, and 3,595,661 relate to photographic film packs comprising an enclosure containing self-developing film units integrated with a power supply system. Such film packs are presently employed in automatic cameras such as that sold by the Polaroid Corporation of Cambridge, Mass., U.S.A., under the trademark SX-70.

The photographic cycle for the SX-70 camera involves a somewhat complex series of operational events each imposing electrical power demands and each being controlled by an integrated solid state control circuit. As detailed in U.S. Pat. No. 3,774,516, this control circuit monitors several mechanical manipulations of the instrumentalities of the device including a dual energization of a DC electric motor as disclosed in U.S. Pat. Nos. 3,811,081 and 3,731,608, as well as a select multiple energization of exposure regulating tractive electromagnetic drives as described, inter alia, in U.S. Pat. Nos. 3,791,278, 3,750,543, 3,805,204 and 3,820,128. The operational events carried out by the camera include those of securing an exposure chamber, reflex optical path conversion, exposure regulation of a film unit, motor driven film unit removal and processing, and automatic removal of a dark slide which covers the individual self-developing film units in the film pack prior to its insertion into the camera.

To power the camera through a series of the above catalogued operational events, a battery power supply is required which exhibits a low internal impedance and is capable of providing a relatively high current output with multiple cycle capacity. During its powering activity, the battery is called upon to maintain the predetermined voltage levels required for operating integrated logic control circuits.

The desired performance characteristics of batteries of types described above are well defined. Essentially such batteries must be compact and specifically configured for effective integration and assembly with the film pack and at the same time, provide the requisite electrical energy for efficient operation of the camera and related accessories until depletion of the supply of film units in the film pack. Since the batteries are designed to be discarded together with the empty film pack, an economic constraint is involved requiring that they be produced by way of high volume, low cost processes which inevitably dictate the involvement of a high speed, on-line continuous process capable of efficiently assembling batteries and providing maximum production of acceptable batteries with minimum rejects.

In an effort to provide improved batteries, investigations have been made into electrochemical cells other than the LeClanche zinc anode system/manganese dioxide cathode system. One such system involves a cadmium anode system with a suitable cathode system such as manganese dioxide. See, e.g., U.S. Pat. Nos. 3,494,796 and 3,775,273. However, attempts to fabricate the cadmium anode in a suitably thin form have generated problems.

Artisans have heretofore formulated cadmium electrodes by a variety of methods, including electroplating the cadmium onto a variety of substrates; spray depositing cadmium particles; and depositing a cadmium salt on a suitable substrate followed by reducing the cadmium to metallic form. See, e.g., U.S. Pat. Nos. 3,326,721, 3,783,025, 3,837,919, 2,662,928 and 3,770,505. Attempting to adapt such processes and still satisfy the dimensional requirements of the present batteries has occasioned unacceptable products, unacceptably slow fabrication speeds and importantly, the generation or presence of cadmium vapor. Avoiding the presence of cadmium vapor is highly desirable because of the extreme toxicity thereof.

It has now been discovered that a suitably thin cadmium electrode can be rapidly fabricated by effecting a replacement reaction with the zinc in a conventional zinc patch electrode. Such a replacement reaction has been heretofore utilized for the very rapid regeneration of a cadmium anode in a cadmium anode/silver/silver chloride secondary energy storage system (U.S. Pat. No. 4,048,404), but it has not heretofore been recognized that the reaction can be used with advantage in forming a thin cadmium patch electrode which is used in a primary, i.e., non-rechargeable, battery.

Accordingly, it is the object of this invention to provide a new anode construction which will be used in battery cells and batteries meeting all of the foregoing electrical requirements and which can be fabricated easily, rapidly and without the generation of cadmium vapor. The manner in which this and other objects of the invention are achieved will become apparent to those skilled in the art from the following detailed description.

SUMMARY OF THE INVENTION

The present invention is concerned with a primary battery anode and to electrical cells and batteries utilizing the anode. The requisite thinness and compactness for photographic utilization is retained and satisfactory current drain capacities and recovery rates are attained. As a consequence, batteries in accordance with the invention are advantageously suited for powering advanced photographic systems incorporating electronic shutters, film advance motors and the like. Alternatively, if desired, the anode and battery of the present invention can be formulated in cylindrical cells similar to conventional "D" cells, or made in cylindrical form by rolling up a thin, flat structure.

The anode of the present invention comprises a dispersion of cadmium particles on a conductive plastic substrate. Battery cells constructed in accordance with the present invention include such an anode in conjunction with a suitable cathode such as manganese dioxide and a suitable electrolyte such as cadmium chloride, and batteries comprise a plurality of such cells electrically interconnected in series or in parallel as desired. A subsidiary and less preferred embodiment of the present invention includes a battery containing the instant anode formed in situ.

DESCRIPTION OF THE INVENTION

The anode of the present invention is fabricated by effecting a replacement reaction with the zinc in a zinc dry patch electrode. Such dry patch electrodes are well known and are generally formed by depositing, on the desired electrochemically active area of a conductive substrate by printing, silk screening or the like, an aqueous mixture of particulate zinc, particulate carbon and a binding agent. The aqueous phase of the mixture is subsequently removed by heat induced vaporization. Typical of the binders which can be used are such polymeric agents as methyl cellulose, polyethylene oxide, hydroxypropyl cellulose, anionic heteropolysaccharides, poly-2-acrylamido-2-methyl propane sulfonic acid, and the like; inorganic agents such as hydrous magnesium aluminium silicate, highly purified magnesium montmorillonite, colloidal silica, complex magnesium aluminum silicate, and the like; and natural gums such as guar gum and the like. The conductive substrate can be a plastic, i.e., a polymer, as exemplified by such diverse materials as polyacrylates, polyvinyl halides, polyvinylidene halides, polyacrylonitriles, copolymers of vinyl chloride and vinyl acetate or vinylidene chloride, polychloroprene, butadiene-styrene, butadiene-acrylonitrile, polyolefines such as polyethylene and polyisobutylene and the like. Such plastics are filled with a sufficient quantity of a suitable conductive material such as carbon black to render them conductive, and typically have a thickness of about 2 mils.

The replacement reaction is effected by contacting the zinc dry patch electrode with an aqueous solution of a soluble cadmium salt, preferably cadmium chloride. The zinc displaces cadmium ions in the solution and the cadmium forms as particulate metal in the dry patch electrode. The concentration of cadmium in the solution is not critical but should be at least that sufficient to displace all of the zinc in the dry patch since the presence of zinc in a cadmium electrode is deleterious and leads to anode instability. Since the displacement reaction is stoichiometric; the cadmium concentration in the solution should thus be at least one mole per mole of zinc in the dry patch. It is further preferred to also employ an agent in the aqueous cadmium chloride solution which encourages the displaced zinc to remain dissolved in the aqueous solution. One such agent is ammonium chloride.

The displacement reaction cqn be conveniently carried out by immersing the zinc patch electrode in the aqueous solution of cadmium chloride and allowing it to soak for a suitable length of time. The displacement reaction is very rapid. The amount of time necessary will vary depending on the concentration of the zinc in the zinc patch, the particular binder employed in the zinc patch, and the concentration and other additives in the aqueous zinc chloride solution. Optimum soaking time can readily be established by a few simple laboratory experiments. The soaking is conveniently effected under ambient temperature and pressure conditions.

Following the contacting, the resulting cadmium patch anode is washed to remove the displaced zinc from contact therewith. Any wash liquid in which the zinc chloride formed by the reaction is soluble and will not deleteriously effect the cadmium patch anode can be employed such as, for example, water, cadmium chloride, ammonium chloride, ethylene diamine tetraacetic acid, and the like. A wash liquid containing ammonium chloride or cadmium chloride is preferred since they retard the formation of zinc in an insoluble form. It is also preferred to utilize plain water in the final washing of the cadmium patch anode to remove all salts from the regions of the conductive patch substrate bordering the anode patch. Thereafter, the cadmium patch anode is dried at any suitable temperature from ambient up to about 120° C.

The anode structure of the present invention can be formulated into a battery cell by combination with a suitable electrolyte and cathode in a wide variety of arrangements as is known in the art. For example, the cathode can be of the dry patch variety such as described, for instance, in U.S. Pat. No. 3,770,504, a hybrid type cathode such as described, e.g., in U.S. Pat. No. 4,007,472 or a slurry type cathode such as disclosed in U.S. Pat. No. 3,953,242. A dry patch cathode can be prepared in the same manner as described above for the zinc patch anode, except that a cathode active material such as manganese dioxide is substituted for the zinc. A slurry cathode is a slurry of particulate active material in an aqueous electrolyte and a hybrid cathode comprises a cathode slurry layer deposited on a dry patch cathode layer.

It is generally preferable to separate the cathode from the anode by use of a suitably dimensioned sheet of battery separator material. This material is selected so as to be wettable by the slurry deposit with which it is in contact as well as being ionically permeable. Among the materials conventionally used as separators are those made of fibers and cellulosic materials, woven or non-woven fibrous materials such as polyester, Mylar, polypropylene, polyethylene and glass. Kraft paper having thickness of about 2 mils has been found adequate for the purposes of the present invention.

Deposited over the anode is the electrolyte. The electrolyte will ordinarily comprise an aqueous solution of an electrodissociable salt together with a gelling agent such as hydroxyethyl cellulose. The electrolyte can be deposited utilizing conventional positive displacement techniques, doctoring, silk screening or the like. Any of the conventional electrodissociable salts heretofore known can be used in the invention. In a preferred embodiment of the present invention, the salt is cadmium chloride.

The electrolyte preferably does not contain any zinc since, as mentioned before, zinc leads to instability of the instant cadmium patch anode. However, it may be desirable to include ammonium chloride in the electrolyte to improve conductivity and to inhibit the formation of insoluble cadmium salts.

The batteries of the present invention can also be formed in situ. The zinc patch anode, a suitable cathode and a cadmium chloride electrolyte are assembled and the displacement reaction occurs in the assembled battery to realize a cadmium patch anode. It will be appreciated, however, that such an in situ prepared battery does not permit elimination of the displaced zinc which is then present in the electrolyte. Accordingly, this embodiment of the invention is not preferred but may be accetable in some circumstances.

In order to further illustrate the present invention, various examples are given hereinafter. It should be appreciated that unless otherwise specified, all parts and percentages are by weight and all temperatures in degrees Centigrade throughout this description and the appended claims.

EXAMPLE 1

A dry patch zinc anode was prepared from a dispersion of 1,000 grams of powdered zinc, 5 grams of carbon black, 39.1 grams of Polytex 6510 (an acrylic emulsion resin sold by Celenese Corp.), 0.62 grams of Bentone LT (a hydrous magnesium aluminum silicate), 0.25 grams of tetrasodium pyrophosphate and 150 grams of water. The dispersion so formed was deposited on a conductive plastic base (Condulon—a mixture of poly[vinyl chloride-vinyl acetate] copolymer and nitrile rubber containing 30-40% carbon black), which was 2 mils thick, following which the aqueous phase of the zinc dispersion was removed by heat induced vaporization to provide about 0.5 grams of anode material distributed over an anode area of about $1\frac{7}{8} \times 2\frac{1}{2}$ inches. The zinc dry patch anode was immersed in a solution of cadmium chloride for about 4 minutes, washed first with additional cadmium chloride solution and thereafter with water, and then allowed to air dry.

The resulting cadmium dry patch anode was assembled into a cell with a dry patch cathode containing manganese dioxide and carbon black (the patch mixture weighing about 0.85 grams) and a gel electrolyte which contained 78.4% water, 9.8% ammonium chloride, and 9.8% cadmium chloride and 2% hydroxyethyl cellulose, by weight based on the weight of electrolyte. The electrolyte had a pH of 3.7. The resulting cell exhibited an open cell voltage of 1.30.

EXAMPLE 2

Example 1 was repeated using a weight on the cell to hold the components in good contact and to act as a current collector. In this instance, the observed open cell voltage was 1.43.

EXAMPLE 3

Example 1 was repeated except that the weight of cathode patch mixture was 0.9 grams and the gel electrolyte was a mixture of 79% water, 20% ammonium chloride and 1% cadmium chloride having a pH of 5.5. The observed open cell voltage was 1.43.

Various changes and modifications can be made in the product and process of this invention without departing from the spirit and scope thereof. The various embodiments disclosed herein were for the purpose of further illustrating the invention and were not intended to limit it.

Having thus described the invention, what is claimed is:

1. A primary electrochemical cell comprising an anode comprising cadmium, a cathode comprising manganese dioxide and an electrolyte consisting essentially of aqueous cadmium chloride wherein said anode is a cadmium dry patch anode and is prepared by contacting a zinc patch electrode which comprises a dispersion of particulate zinc in a binder matrix deposited on a conductive plastic substrate with an aqueous solution of cadmium salt for a time sufficient for the zinc and cadmium to undergo a mutual exchange reaction.

2. A primary battery comprising a plurality of primary electrochemical cells of claim 1.

3. A flat laminar primary battery in accordance with claim 2.

4. An electrical cell, comprising an anode consisting essentially of cadmium, a cathode of manganese dioxide and carbon, and an electrolyte consisting essentially of water, ammonium chloride and cadmium chloride.

* * * * *